(12) United States Patent
Hiruma

(10) Patent No.: US 11,772,350 B2
(45) Date of Patent: Oct. 3, 2023

(54) PRESS DEVICE, LOAD CORRECTION METHOD, AND RECORDING MEDIUM

(71) Applicant: JANOME SEWING MACHINE CO., LTD., Hachioji (JP)

(72) Inventor: Kenichiro Hiruma, Hachioji (JP)

(73) Assignee: JANOME SEWING MACHINE CO., LTD., Tokyo (JP)

( * ) Notice: Subject to any disclaimer, the term of this patent is extended or adjusted under 35 U.S.C. 154(b) by 741 days.

(21) Appl. No.: 16/960,087

(22) PCT Filed: Aug. 24, 2018

(86) PCT No.: PCT/IB2018/056419
§ 371 (c)(1),
(2) Date: Jul. 6, 2020

(87) PCT Pub. No.: WO2019/142027
PCT Pub. Date: Jul. 25, 2019

(65) Prior Publication Data
US 2022/0126543 A1    Apr. 28, 2022

(30) Foreign Application Priority Data

Jan. 17, 2018 (JP) ................................ 2018-005626

(51) Int. Cl.
*B30B 15/26* (2006.01)
*G01L 5/00* (2006.01)
(Continued)

(52) U.S. Cl.
CPC ............ *B30B 15/26* (2013.01); *B30B 15/148* (2013.01); *B30B 15/281* (2013.01);
(Continued)

(58) Field of Classification Search
CPC ............................. B30B 15/26; G01L 5/0038
See application file for complete search history.

(56) References Cited

U.S. PATENT DOCUMENTS

2010/0126361 A1 * 5/2010 Fukami ................. B30B 15/047
100/99
2015/0068412 A1    3/2015 Yanagi et al.

FOREIGN PATENT DOCUMENTS

EP        0612992 A2 *  8/1994
JP        S63-298112 A  12/1988
(Continued)

OTHER PUBLICATIONS

International Search Report for PCT/IB2018/056419 dated Dec. 4, 2018.
PCT written opinion dated Dec. 4, 2018.

*Primary Examiner* — Mark A Connolly
(74) *Attorney, Agent, or Firm* — Yokoi & Co., U.S.A.; Toshiyuki Yokoi

(57) ABSTRACT

Press-fitting work is evaluated by appropriately determining a load when sliding occurs. A load-drop determination unit determines whether or not a load value detected by a load detecting unit exceeds a load-drop determination value decided based on a moving average value and a dispersion average value stored in a storage unit. A data substitution unit substitutes the load value which is determined to exceed the load-drop determination value in the load-drop determination unit with a predetermined value.

8 Claims, 17 Drawing Sheets

(51) Int. Cl.
*B30B 15/14* (2006.01)
*B30B 15/28* (2006.01)
*G05B 19/4062* (2006.01)

(52) U.S. Cl.
CPC ........ *G01L 5/0038* (2013.01); *G05B 19/4062* (2013.01); *G05B 2219/39112* (2013.01)

(56) References Cited

FOREIGN PATENT DOCUMENTS

| | | |
|---|---|---|
| JP | 4053812 B2 * | 2/2008 |
| JP | 2008-137015 A | 6/2008 |
| JP | 2015-51453 A | 3/2015 |

* cited by examiner

PRESS DEVICE, LOAD CORRECTION METHOD, AND RECORDING MEDIUM

TECHNICAL FIELD

The present invention relates to a press device, a load correction method, and a program.

BACKGROUND ART

A servo press for driving a ram by a servo motor is conventionally known (e.g., shown in Patent Document 1). In the servo press, the position and speed of the ram can be controlled with high accuracy. Therefore, the servo press can be easily combined with peripheral equipment such as a conveyance device which is used for carrying in/out a workpiece. Thus, the servo press has the feature of improving the productivity.

In addition, the above described kind of servo press is characterized in that whether or not press-fitting work is performed successfully is determined by always monitoring a load value in the press-fitting work, for example. As an example of the specific criteria for determination, as shown in FIG. 17, the function called "load determination" was equipped. In the load determination, positional range and load range are specified and the press-fitting work is determined to be successful when it is performed within a rectangular range of the positional range and the load range.

In the above described load determination, two positions of "determination start position" and "determination finish position" are specified, and "maximum load" and "minimum load" are specified in the two positions. Namely, as shown in FIG. 17, a determination flame having a rectangular shape is formed by four points. Then, the press-fitting work is determined to be successful when the position and the load value of the actual work are within the determination flame, and determined to be unsuccessful when they are out of the determination flame.

PRIOR ART DOCUMENTS

Patent Documents

[Patent Document 1] Japanese Unexamined Patent Application Publication No. 2008-137015

DISCLOSURE OF THE INVENTION

Problems to be Solved by the Invention

However, the principle of generating the load is different between the press-fitting work and the work of molding or bending. Namely, in the press-fitting work, the load is generated as a resistance force generated in accordance with the friction coefficient or as a repulsion force like a damper. In addition, the load value generated in the press-fitting work tends to be constant.

However, the phenomenon of suddenly increasing the load value (e.g., galling) or momentarily decreasing the pressing load caused by the sliding occurs in the press-fitting work. In the above described phenomenon, the galling where the load value is suddenly increased can be judged by adjusting the maximum value of the press-fitting. However, as for the load-drop caused by the momentary occurred sliding, some values should be treated as normal depending on the degree of the load-drop. Therefore, the minimum load of the load determination is lowered sufficiently or the determination is performed for a moving average value of the load.

As described above, the phenomenon of sudden load-drop can be relieved to a certain extent by calculating the moving average value of the load value for performing the determination.

However, if the moving average value is used, the value is lowered when the load is decreased. Thus, the minimum load value for the determination should be lowered by that amount. On the other hand, it is also desired to narrow the determination range of the load value of the normally press-fitted for finding a sign of failure. Because of this, while the work itself is determined to be successful, precautionary maintenance is enabled (e.g., determined to require some cares). In addition, there is a doubt about validity of evaluating the entire press-fitting work in a state that the load value generated by accidental reason is included in the calculation of the moving average value.

FIG. 16 is a graph showing the moving average value of the load value about the data including the load value where the load-drop caused by the load slipping occurs. As shown in FIG. 16, the load-drop is smoothed to a certain extent by calculating the moving average value of the load value. In addition, if the limit of the moving average value of the load value is widely specified, the load-drop is smoothed more significantly. Thus, the effect of removing the influence of the load-drop can be expected. However, there is no validity for the meaning of calculating the moving average value of the load value about the data where the load-drop caused by the slipping occurs. It is considered that there is no meaning for calculating "average" about the objects which have different mechanisms of load generation.

The present invention is made in consideration of the above described problems, and the present invention aims for providing a press device, a load correction method and a program capable of evaluating the press-fitting work by properly determining the load when the slipping occurs.

Means for Solving the Problem

Aspect 1; One or more embodiments of the present invention proposes a press device, having: a position detection unit that detects a position of a ram; a load detecting unit that detects a load value applied to the ram; a determination unit that determines whether or not a press-fitting process is normally preformed on a workpiece based on the position of the ram and the load value at the position; a storage unit that stores a moving average value and a dispersion average value of the load value which are preliminarily calculated; a load-drop determination unit that determines whether the load value detected by the load detecting unit exceeds a load-drop determination value which is decided based on the stored moving average value and the dispersion average value; and a data substitution unit that substitutes the load value which is determined to exceed the load-drop determination value in the load-drop determination unit with a predetermined value.

Aspect 2; One or more embodiments of the present invention proposes the press device, wherein the data substitution unit substitutes the load value which is determined to exceed the load-drop determination value in the load-drop determination unit with an average value of the load value before the load value applied to the workpiece is determined to exceed the load-drop determination value.

Aspect 3; One or more embodiments of the present invention proposes the press device, wherein the data substitution unit substitutes the load value which is determined to exceed the load-drop determination value in the load-drop determination unit with a normal load value which is determined to be normal before the load value applied to the workpiece is determined to exceed the load-drop determination value.

Aspect 4; One or more embodiments of the present invention proposes the press device, wherein the data substitution unit substitutes the load value which is determined to exceed the load-drop determination value in the load-drop determination unit with a normal load value which is determined to be normal after the load value applied to the workpiece is determined to exceed the load-drop determination value.

Aspect 5; One or more embodiments of the present invention proposes the press device, further having a press-fitting process determination unit that determines whether or not the press-fitting process is normally preformed on the workpiece based on a load value data of a series of the press-fitting process including the load value data substituted by the data substitution unit.

Aspect 6; One or more embodiments of the present invention proposes the press device, further having a counting unit that counts the number of times where the load value is determined to exceed the load-drop determination value in the load-drop determination unit, wherein the press-fitting process determination unit determines whether or not the press-fitting process is normally preformed on the workpiece considering the number counted by the counting unit.

Aspect 7; One or more embodiments of the present invention proposes a load correction method in a press device, the press device comprising: a position detection unit that detects a position of a ram; a load detecting unit that detects a load value applied to the ram; a determination unit that determines whether or not a press-fitting process is normally preformed on a workpiece based on the position of the ram and the load value at the position; a storage unit that stores a moving average value and a dispersion average value of the load value which are preliminarily calculated; a load-drop determination unit; a data substitution unit; and a press-fitting process determination unit, the method comprising: a first process of determining whether the load value detected by the load detecting unit exceeds a load-drop determination value which is decided based on the stored moving average value and the dispersion average value by the load-drop determination unit; and a second process of substituting the load value which is determined to exceed the load-drop determination value in the load-drop determination unit with a predetermined value by the data substitution unit.

Aspect 8; One or more embodiments of the present invention proposes a program for making a computer execute a load correction method in a press device, the press device comprising: a position detection unit that detects a position of a ram; a load detecting unit that detects a load value applied to the ram; a determination unit that determines whether or not a press-fitting process is normally preformed on a workpiece based on the position of the ram and the load value at the position; a storage unit that stores a moving average value and a dispersion average value of the load value which are preliminarily calculated; a load-drop determination unit; a data substitution unit; and a press-fitting process determination unit, the method comprising: a first process of determining whether the load value detected by the load detecting unit exceeds a load-drop determination value which is decided based on the stored moving average value and the dispersion average value by the load-drop determination unit; and a second process of substituting the load value which is determined to exceed the load-drop determination value in the load-drop determination unit with a predetermined value by the data substitution unit.

Aspect 9; One or more embodiments of the present invention proposes the press device wherein the press-fitting process determination unit determines that the press-fitting process on the workpiece is abnormal when the number of counts counted by the counting unit exceeds a preliminarily determined number of counts.

Aspect 10; One or more embodiments of the present invention proposes the press device wherein the press-fitting process determination unit determines that the press-fitting process on the workpiece is abnormal when a continuous occurrence count counted by the counting unit exceeds a preliminarily determined number of continuous occurrence count.

Aspect 11; One or more embodiments of the present invention proposes the press device wherein the press-fitting process determination unit determines that the press-fitting process on the workpiece is abnormal when a continuous occurrence distance corresponding to a continuous occurrence count counted by the counting unit exceeds a preliminarily determined continuous occurrence distance.

Effects of the Invention

In one or more of embodiments of the present invention, the effect of enabling the evaluation of the press-fitting work can be obtained by properly determining the load when the sliding occurs.

MODES FOR CARRYING OUT THE INVENTION

First Embodiment

Hereafter, the first embodiment of the present invention will be explained by using FIG. 1 to FIG. 11.

<Configuration of Press Device>

The configuration of a press device 100 concerning the present embodiment will be explained by using FIG. 1.

Figure 1:
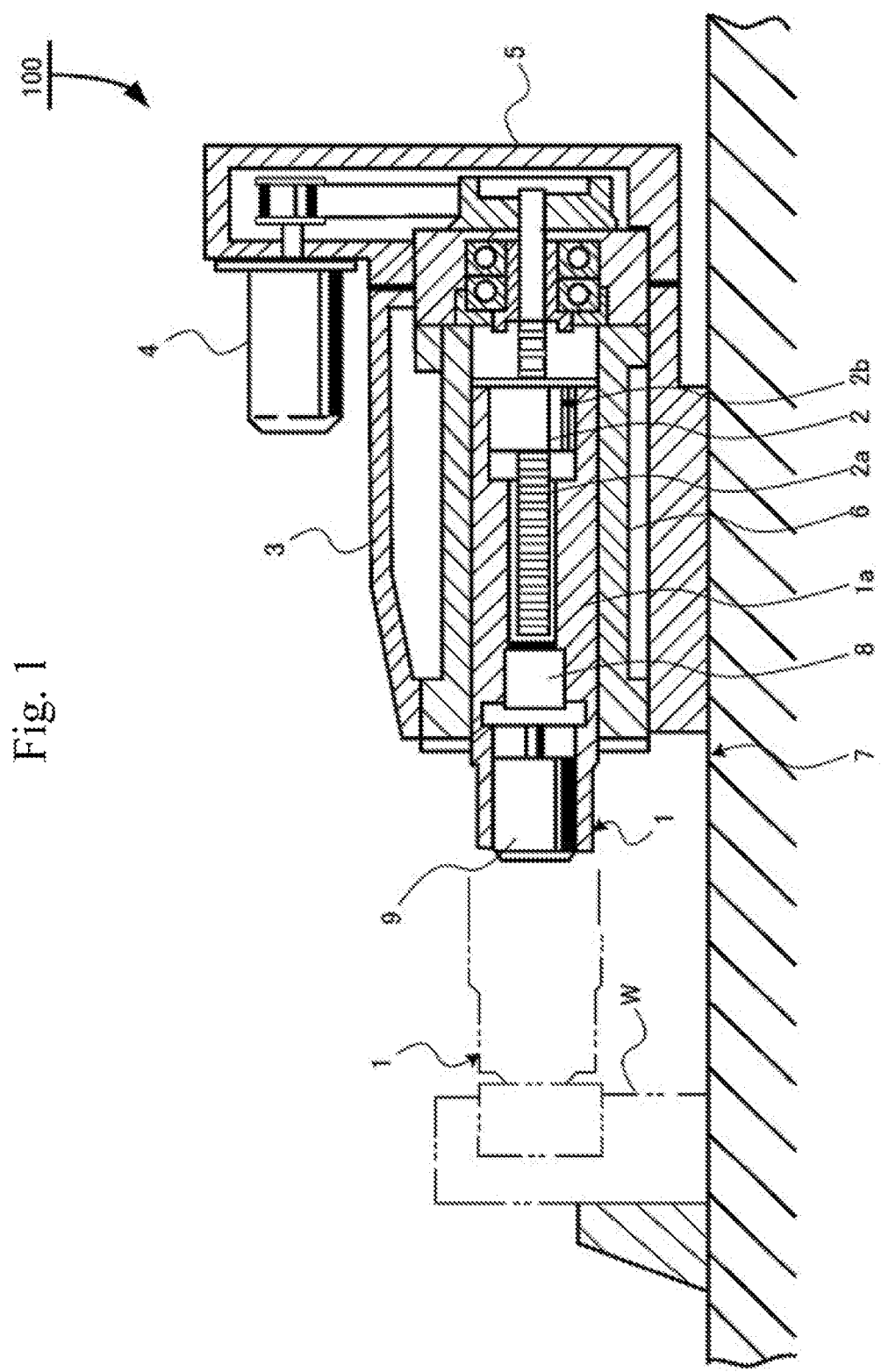
FIG. 1 is a drawing showing the configuration of a press device concerning the first embodiment of the present invention.

As shown in FIG. 1, the press device 100 concerning the present embodiment is comprised of a pressing ram 1 that applies a desired pressure to a workpiece W (object to be processed) by ascending and descending movement, and a ball screw 2 that gives the ascending and descending movement (linear motion) to the ram 1. The ram 1 and the ball screw 2 are provided inside a press body 3. In addition, a servo motor 4 such as an AC servo motor is housed in a flame body located at the head part of a casing 5 connected to the press body 3 to function as a driving source. The drive of the servo motor 4 is transmitted to the ball screw 2 through a pulley and a belt.

The ram 1 is formed in a cylindrical shape as shown in FIG. 1. Specifically, a tubular body 1a is formed in a cylindrical shape and a hollow portion is formed inside the tubular body 1a along the axial direction. A screw shaft 2a of the ball screw 2 can be inserted into the hollow portion. In addition, a nut element 2b of the ball screw 2 is fixed to the end portion in the axial length direction of the tubular body 1a of the ram 1.

A strain column 9 can be freely mounted onto the tip portion of the tubular body 1a. Actually, the strain column 9 is brought into contact with the workpiece W to apply the pressure as needed. In addition, a strain gauge can be mounted on the strain column 9. The pressure applied to the workpiece W can be detected by the strain gauge.

A tubular guide 6 is provided so as to cover the outer peripheral side surface of the tubular body 1a. The tubular guide 6 is fixed inside the casing 5. The ram 1 can be ascended and descended along the tubular guide 6.

<Electrical Configuration of Press Device>

Figure 2:
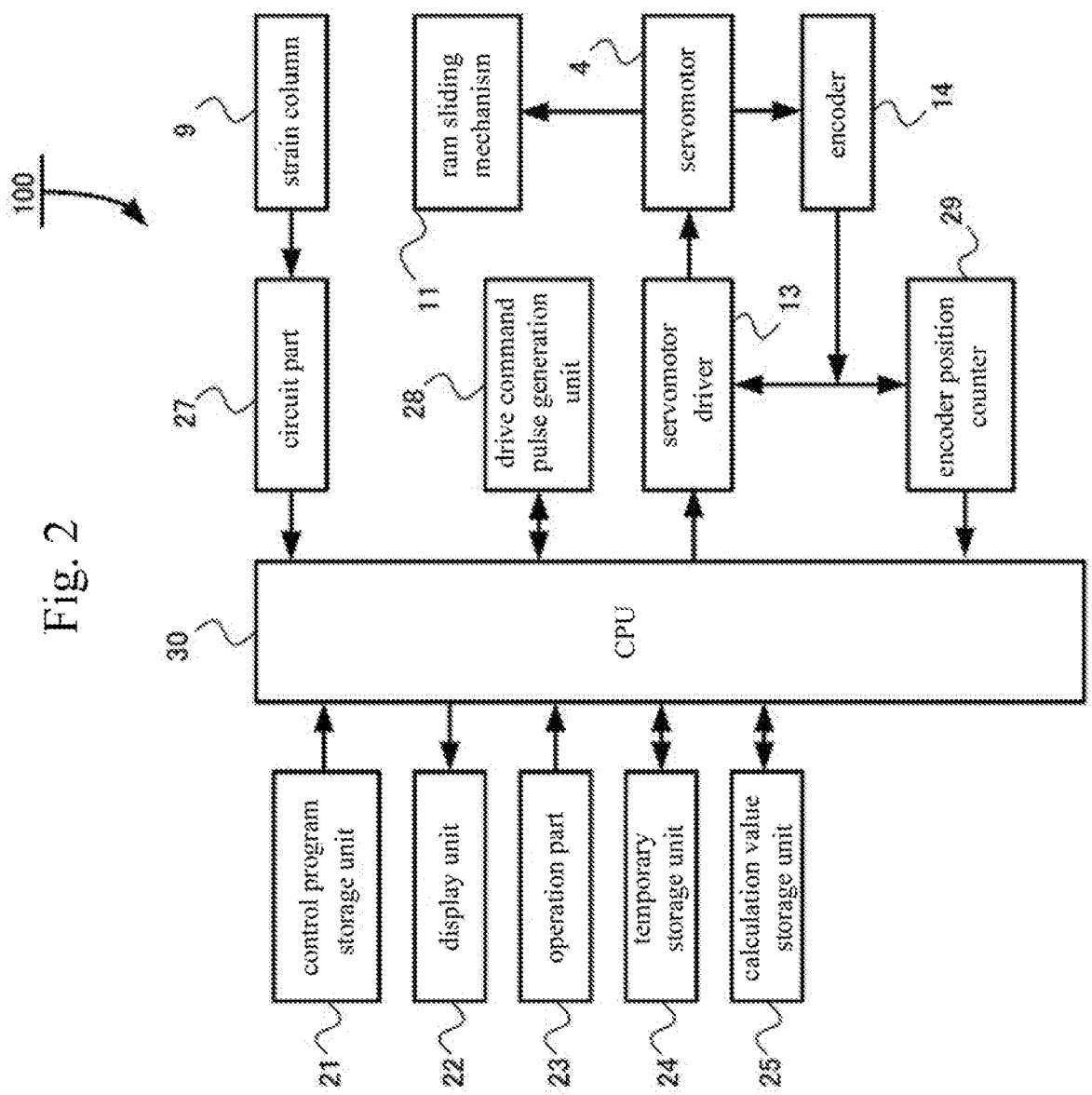
FIG. 2 is a drawing showing the electrical configuration of the press device concerning the first embodiment of the present invention.

As shown in FIG. 2, the press device 100 concerning the present embodiment is comprised of a servomotor driver 13, an encoder 14, a control program storage unit 21, a display unit 22, an operation part 23, a temporary storage unit 24, a calculation value storage unit 25, a circuit part 27, a drive command pulse generation unit 28, an encoder position counter 29 and a CPU (central processing unit) 30.

The control program storage unit 21 stores control programs so that the CPU (central processing unit) 30 controls the operation and processes of the entire press device 100. For example, in the present embodiment, the control program storage unit 21 stores a main program related to the pressing operation, and further stores the later described programs such as a program for determining whether or not the press-fitting process is normally performed, a program for calculating a moving average value, a program for calculating a variance value, a program related to the data substitution, and a program related to the display. The display unit 22 is a display device for displaying various information. In the present embodiment, the display unit 22 displays the information such as the determination result of the press-fitting process.

The operation part 23 is comprised of a touch panel for specifying the press-fitting condition or the like and a tact switch, for example. The temporary storage unit 24 stores temporary data. In the present embodiment, the temporary storage unit 24 stores the obtained position and load value, for example. The calculation value storage unit 25 stores the calculated moving average value and variance value, for example.

The circuit part 27, which functions as a load detecting unit, amplifies the signal corresponding to the resistance change of the strain gauge mounted on the strain column 9, converts an analog signal to a digital signal by A/D conversion process, and then outputs the signal to the CPU (central processing unit) 30.

The drive command pulse generation unit 28 generates the desired drive command pulse based on the command from the CPU (central processing unit) 30, and outputs the generated drive command pulse signal to the servomotor driver 13 via the CPU (central processing unit) 30. Then, the servo motor 4 is driven by the control of the servomotor driver 13 to slide the ram 1 vertically.

The encoder 14 is a device for detecting the rotation angle of the servo motor 4 and used for detecting the position of the ram 1. In addition, the information of the encoder 14 gives the position information to the servomotor driver 13 for performing feedback control. Furthermore, the position information of the encoder 14 can be read by the CPU (central processing unit) 30 via the encoder position counter 29. Thus, the moving amount of the ram 1 is detected.

The CPU (central processing unit) 30 controls the operation of the entire press device 100 according to the control program stored in the control program storage unit 21. In the present embodiment, the CPU 30 particularly and mainly performs the control related to the determination of the press-fitting process.

<Electrical configuration of Central Processing Unit>

Figure 3:
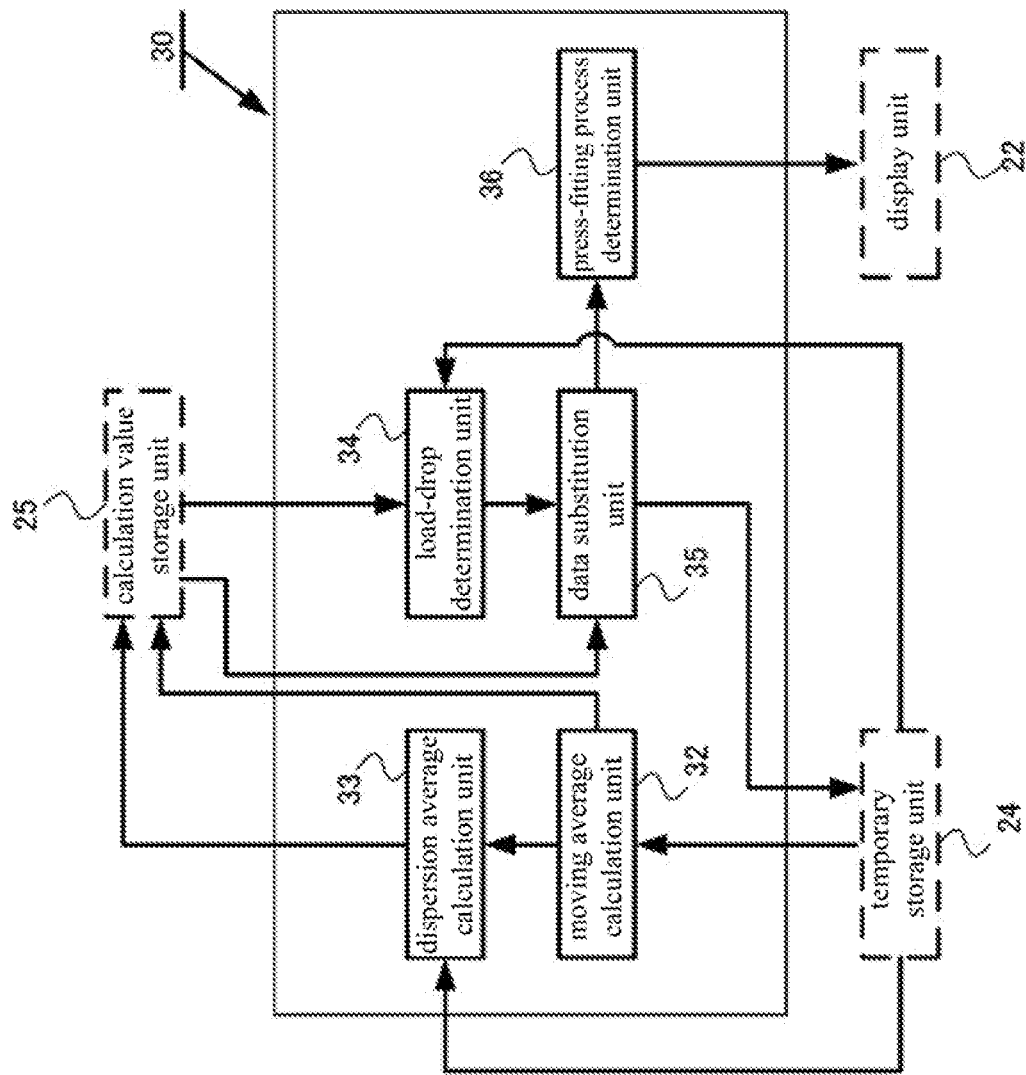
FIG. 3 is a drawing showing the electrical configuration of a central processing unit concerning the first embodiment of the present invention.

As shown in FIG. 3, the central processing unit 30 concerning the present embodiment is comprised of a moving average calculation unit 32, a dispersion average value calculation unit 33, a load-drop determination unit 34, a data substitution unit 35 and a press-fitting process determination unit 36.

The moving average calculation unit 32 calculates the moving average value of the load value obtained from the circuit part 27 stored in the temporary storage unit 24. Specifically, the moving average calculation unit 32 calculates the moving average value of the load value data after the press-fitting work is started until the load value used for the determination is obtained. Then, the calculated moving average value is stored in the calculation value storage unit 25.

Figure 11:
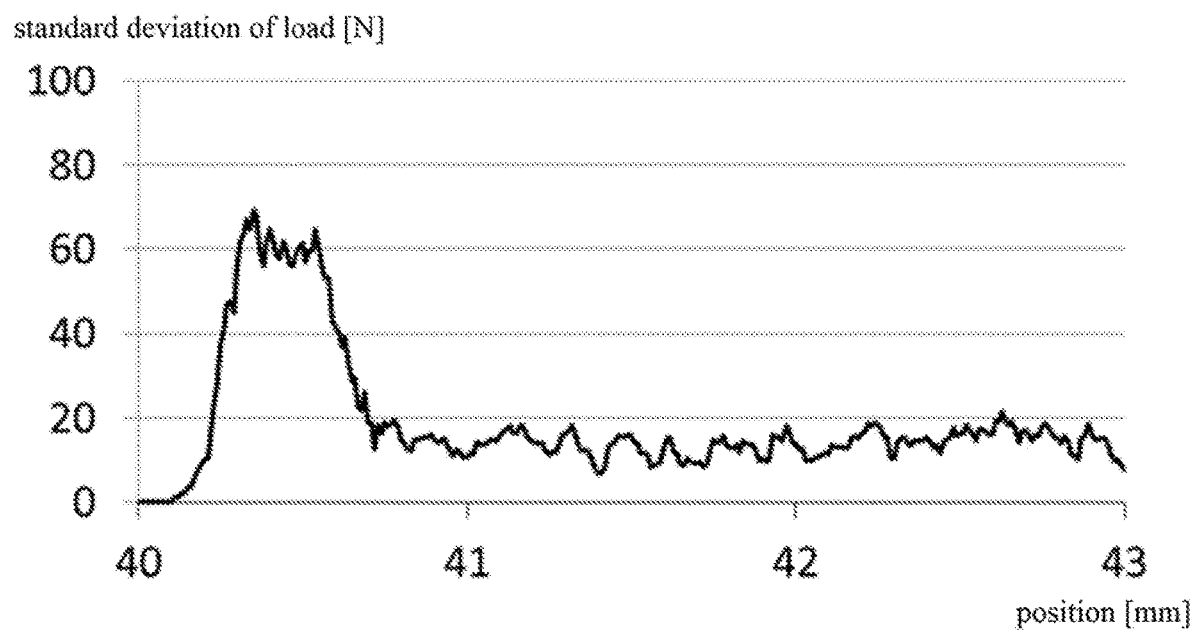
FIG. 11 is a drawing illustrating a standard deviation in the press device concerning the first embodiment of the present invention.

The dispersion average value calculation unit 33 calculates the standard deviation from the moving average value calculated by the moving average calculation unit 32 and the load value stored in the temporary storage unit 24, calculates the variance value, and calculates the dispersion average value of the calculated variance value. Then, the calculated dispersion average value is stored in the calculation value storage unit 25. When test was performed by a real device, the actually occurred load-drop was approximately 300 N as shown in FIG. 11. In addition, the standard deviation was approximately 16 N. Thus, in the present embodiment, the value three times higher than the standard deviation σ is defined as the variance value.

Figure 4:
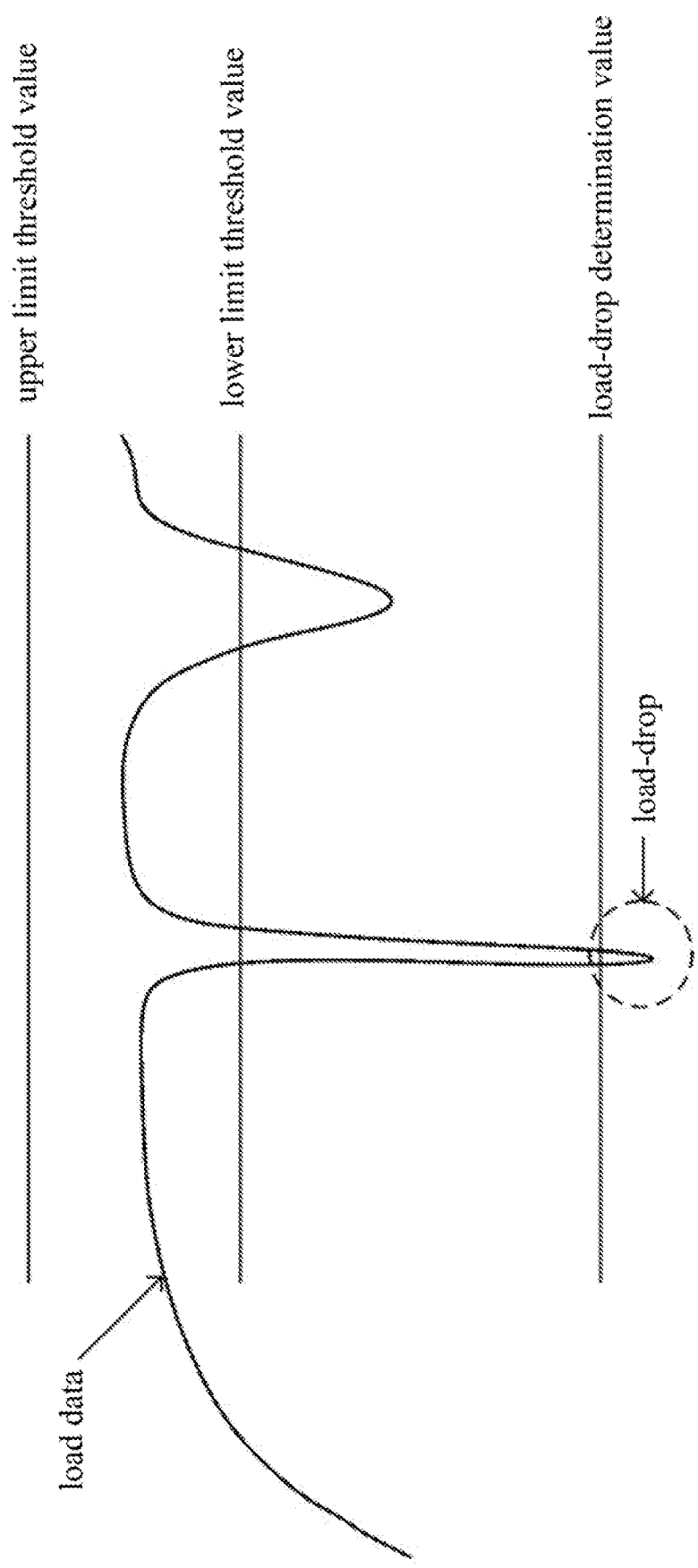
FIG. 4 is a drawing showing the relation of an upper limit threshold value, a lower limit threshold value and a load-drop determination value of the press device concerning the first embodiment of the present invention.

The load-drop determination unit 34 determines (judges) whether or not the load value obtained from the circuit part 27 stored in the temporary storage unit 24 exceeds a load-drop determination value which is decided based on the moving average value calculated by the moving average calculation unit 32 and the dispersion average value calculated by the dispersion average value calculation unit 33. Namely, the relation of the upper limit threshold value, the lower limit threshold value and the load-drop determination value is as shown in FIG. 4. When the load value obtained from the circuit part 27 is lower than the load-drop determination value decided by "average value of moving average value and variance (3σ)", the load-drop caused by the load slipping is determined to occur.

Figure 6:
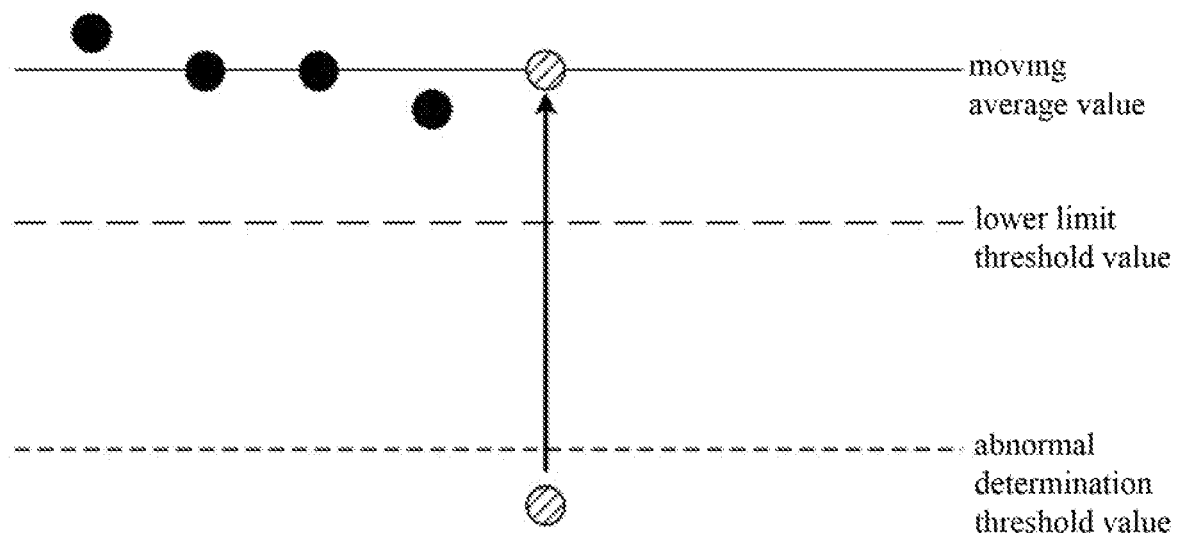
FIG. 6 is a drawing illustrating the processes of data substitution in the press device concerning the first embodiment of the present invention.
Figure 7:
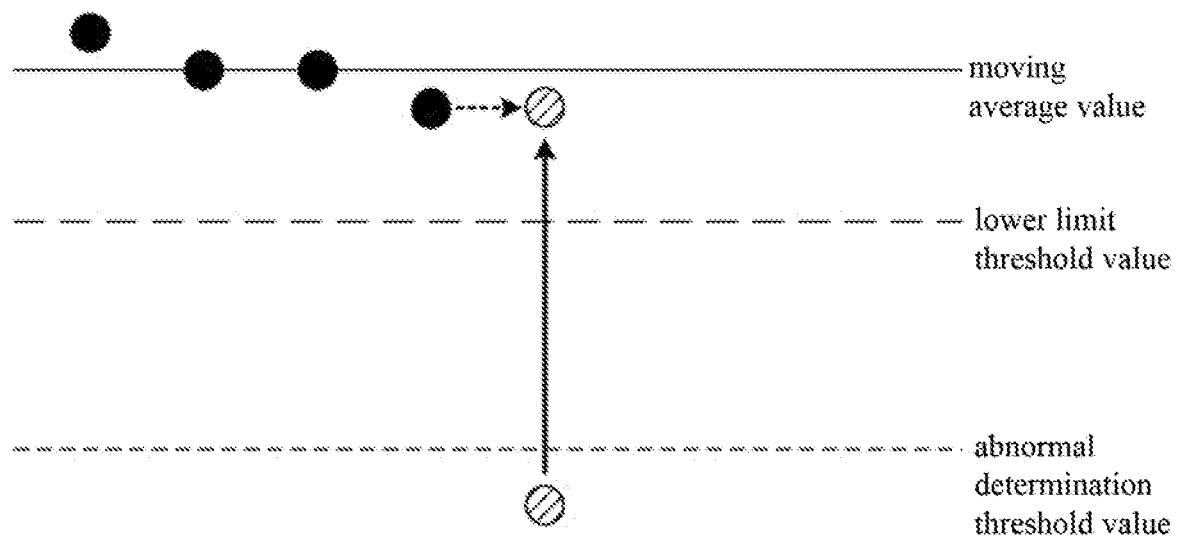
FIG. 7 is a drawing illustrating the processes of data substitution in the press device concerning the first embodiment of the present invention.
Figure 8:
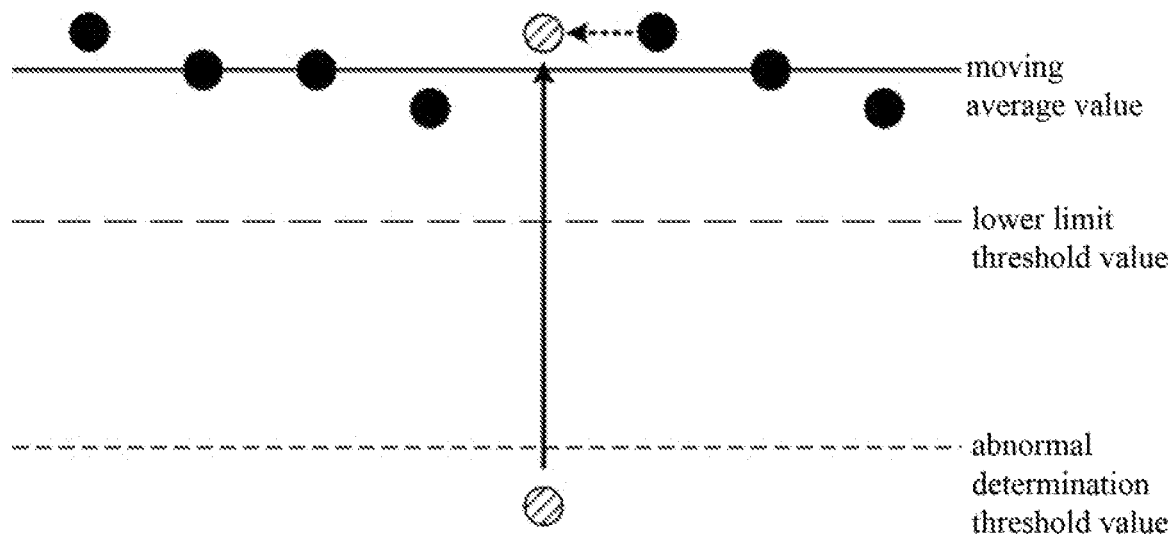
FIG. 8 is a drawing illustrating the process of data substitution in the press device concerning the first embodiment of the present invention.

The data substitution unit 35 substitutes the load value obtained from the circuit part 27 stored in the temporary storage unit 24 with the predetermined value when the load value exceeds the load-drop determination value decided based on the moving average value calculated by the moving average calculation unit 32 and the dispersion average value calculated by the dispersion average value calculation unit 33 in the load-drop determination unit 34. Specifically, as shown in FIG. 6, the load value (circle with oblique lines in the figure) exceeding the load-drop determination value is substituted with the previous moving average value. Alternatively, as shown in FIG. 7, the load value (circle with oblique lines in the figure) exceeding the load-drop determination value is substituted with the normal load value which is determined to be normal before the load value exceeding the load-drop determination value is detected. Alternatively, as shown in FIG. 8, the load value (circle with oblique lines in the figure) exceeding the load-drop determination value is substituted with the normal load value which is determined to be normal after the load value exceeding the load-drop determination value is detected.

The press-fitting process determination unit 36 determines whether or not the press-fitting process is normally (correctly) preformed on the workpiece based on the load value data in a series of the press-fitting process including the load value data substituted by the data substitution unit 35. Then, the determination result is output to the display unit 22 to display the determination result.

<Process of Press Device>

Figure 5:
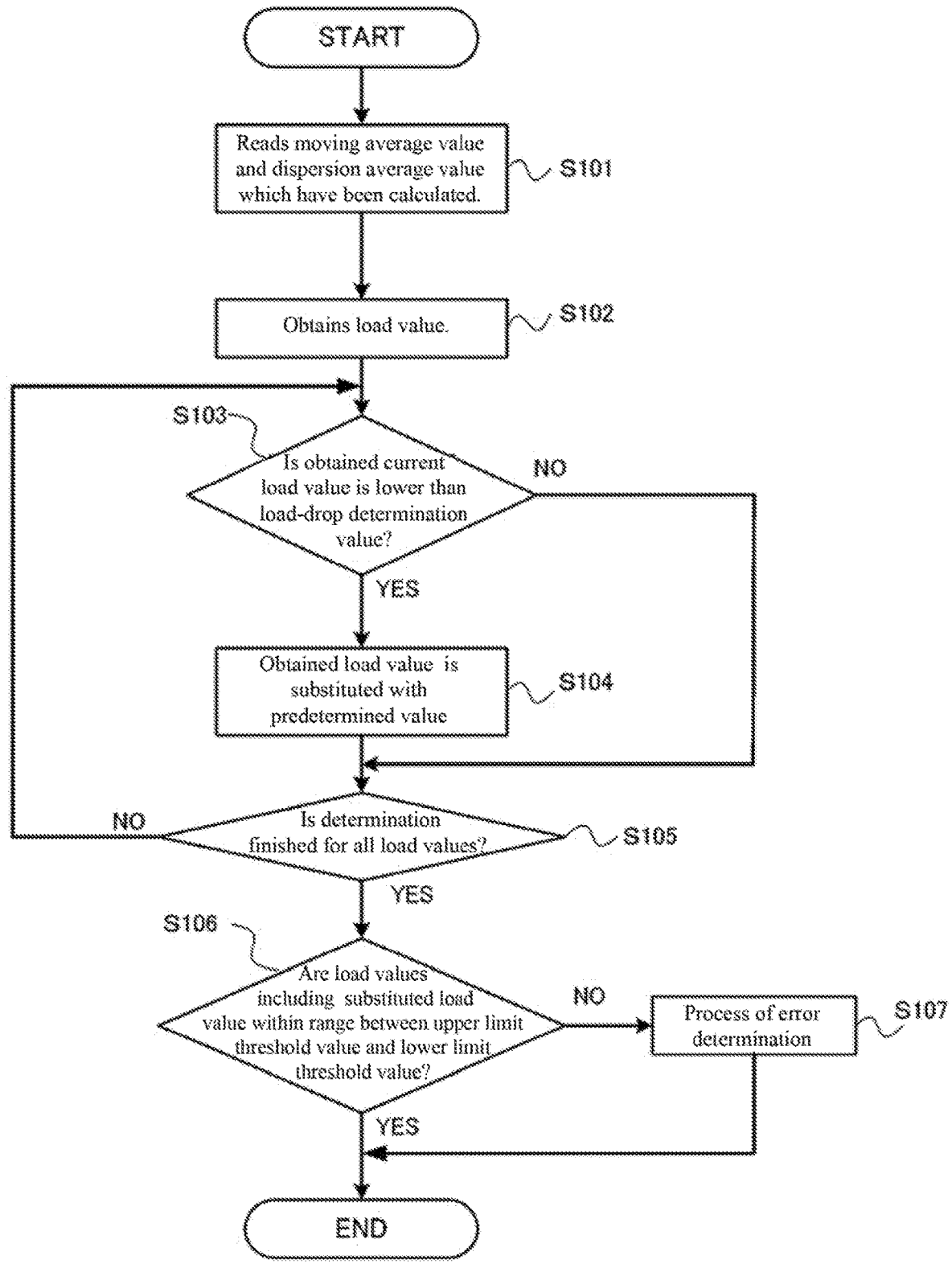
FIG. 5 is a drawing showing the processes of the press device concerning the first embodiment of the present invention.

Hereafter, the processes of the press device 100 concerning the present embodiment will be explained by using FIG. 5.

First, the load-drop determination unit 34 reads the moving average value and the dispersion average value from the calculation value storage unit 25 (Step S101). In addition, the load-drop determination unit 34 obtains the current load value from the temporary storage unit 24 (Step S102).

The load-drop determination unit 34 determines whether or not the obtained current load value is lower than the load-drop determination value (average value of the moving average value and the variance value (3σ)) (Step S103). In the above described step, when the load-drop determination unit 34 determines that the obtained current load value is lower than the load-drop determination value ("Yes" in Step S103), the load value obtained by the data substitution unit 35 is substituted with a predetermined value (e.g., moving average value) or substituted by forward substitution or backward substitution (Step S104). In the above described step, the substituted load value is rewritten and stored in the temporary storage unit 24.

On the other hand, when the load-drop determination unit 34 determines that the obtained current load value is not lower than the load-drop determination value ("No" in Step S103), the process is shifted to Step S105.

Then, the load-drop determination unit 34 determines whether or not the determination of Step S103 is finished for all load values (Step S105). When the load-drop determination unit 34 determines that the determination of Step S103 is not finished for all load values ("No" in Step S105), the process is returned to Step S103. On the other hand, when the load-drop determination unit 34 determines that the determination of Step S103 is finished for all load values ("Yes" in Step S105), the process is advanced to Step S106.

In addition, the press-fitting process determination unit 36 determines whether or not the load values including the substituted load value are within the range between the upper limit threshold value and the lower limit threshold value (Step S106). Here, when the press-fitting process determination unit 36 determines that the load values including the substituted load value are not within the range between the upper limit threshold value and the lower limit threshold value ("No" in Step S106), the process of error determination is performed (Step S107) and all processes are finished.

On the other hand, when the press-fitting process determination unit 36 determines that the load values including the substituted load value are within the range between the upper limit threshold value and the lower limit threshold value ("Yes" in Step S106), the information of the determination result is output to the display unit 22 and the process is finished.

Figure 9:
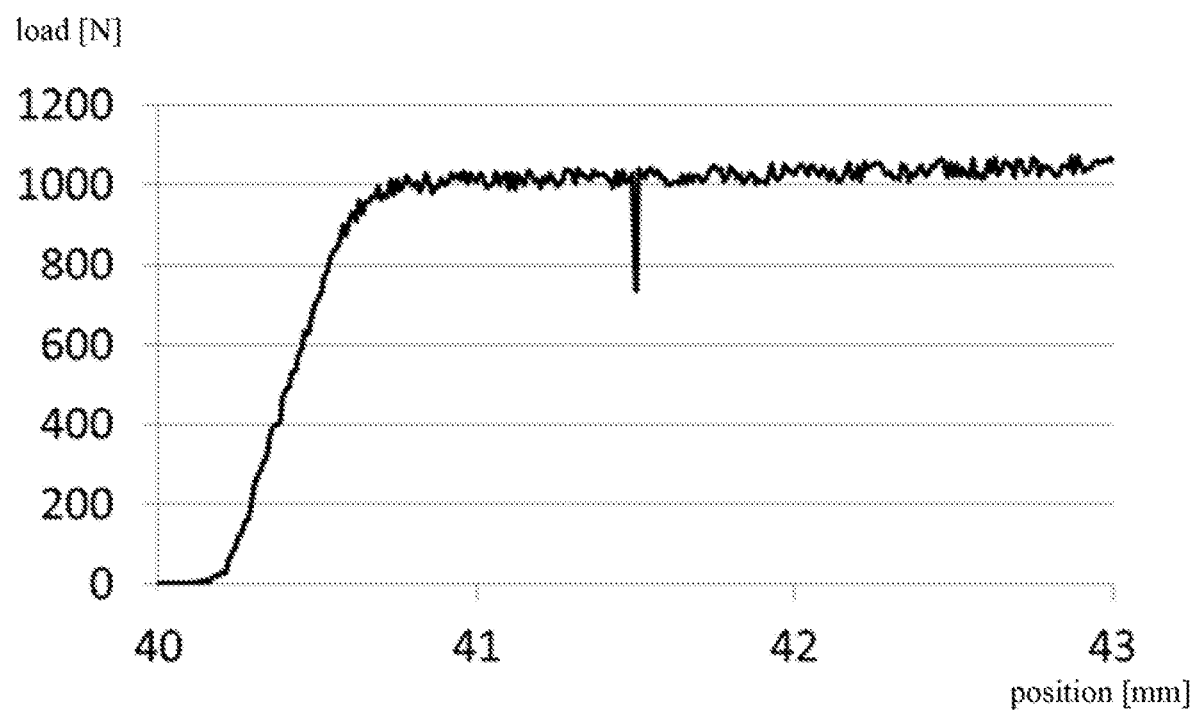
FIG. 9 is a drawing illustrating the position/load data in the press device concerning the first embodiment of the present invention.
Figure 10:
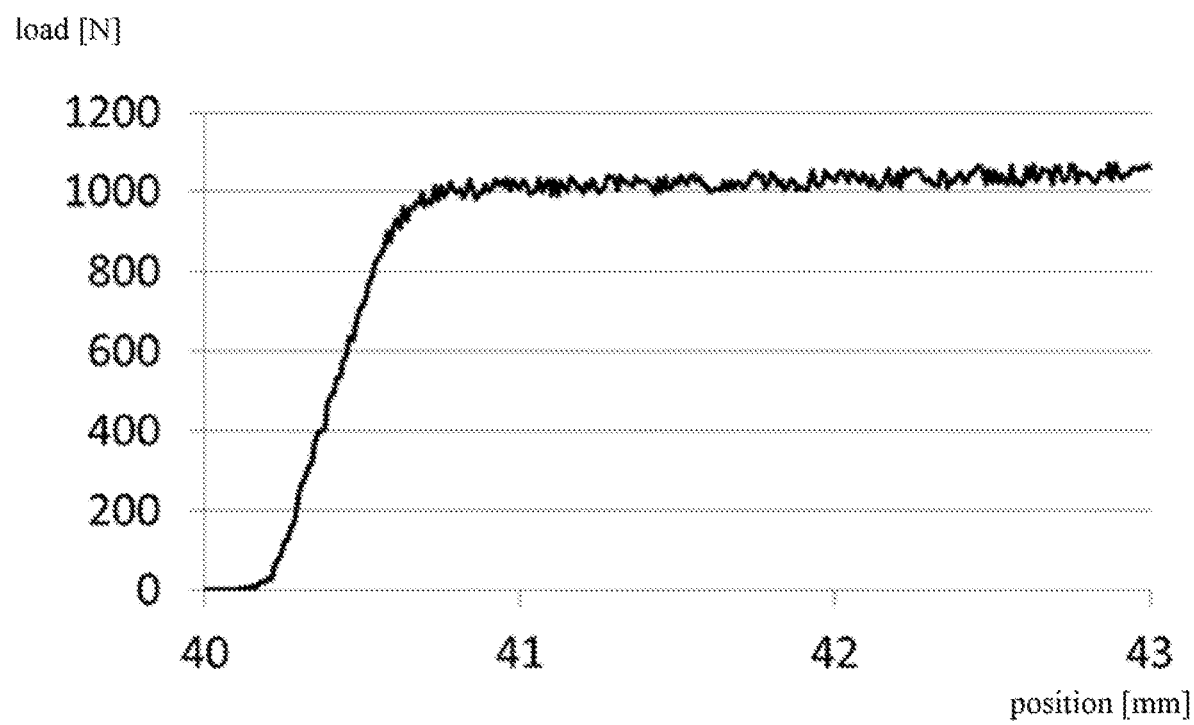
FIG. 10 is a drawing illustrating the position/load data in the press device concerning the first embodiment of the present invention where the data of the load slipping is substituted.

As explained above, in the present embodiment, the load-drop determination unit 34 determines whether or not the detected load value exceeds the load-drop determination value decided based on the stored moving average value and the stored dispersion average value. The data substitution unit 35 substitutes the load value which is determined to exceed the load-drop determination value in the load-drop determination unit 34 with the predetermined value. The press-fitting process determination unit 36 determines whether or not the press-fitting process is normally performed on the workpiece based on the load value data in a series of the press-fitting process including the load value data substituted by the data substitution unit 35. Therefore, the press-fitting work can be evaluated by appropriately determining the load when the sliding occurs. In addition, the determination area can be narrowed by evaluating the press-fitting work while eliminating the load when the sliding occurs. Consequently, it is expected that the information can be used for finding the failure and preventing the failure in the press-fitting work. Here, the specific effects of the present embodiment will be considered by using FIG. 9 and FIG. 10. For example, FIG. 9 shows the data when the sliding occurs. From the figure, the press-fitting is started at the position slightly higher than 40.00 mm, and the load reaches approximately 1000 N at the position around 40.7 mm. After that, an approximately constant load is applied as the press-fitting is advanced. In addition, sudden and instant load-drop can be seen in the figure at the position around 41.5 mm, and the value where the load-drop occurs is approximately 700 N. On the other hand, FIG. 10 shows a graph where the instantly occurred load-drop is eliminated. It can be understood from the figure that the instant load-drop shown in FIG. 9 is eliminated.

In addition, the press-fitting process determination unit 36 determines whether or not the press-fitting process is normally performed on the workpiece based on the load value data of a series of the press-fitting process including the load value data substituted by the data substitution unit 35. Thus, when the press-fitting process is not normally performed because of other reasons than the generation of sliding, the press-fitting process can be determined to be abnormal and the press-fitting work can be determined to be failure.

In addition, the data substitution unit 35 substitutes the load value which is determined to exceed the load-drop determination value in the load-drop determination unit 34 with an average value of the load values before the load value applied to the workpiece is determined to exceed the load-drop determination value. Therefore, even if the load-drop caused by the sliding occurs, the press-fitting process itself is not determined to abnormal. Thus, it is possible to improve the manufacturing yield while maintaining the quality of the press-fitting.

In addition, the data substitution unit 35 substitutes the load value which is determined to exceed the load-drop determination value in the load-drop determination unit 34 with an average value of the load values before the load value applied to the workpiece is determined to exceed the load-drop determination value. Therefore, even if the load-drop caused by the sliding occurs, the press-fitting process itself is not determined to abnormal. Thus, it is possible to improve the manufacturing yield while maintaining the quality of the press-fitting.

In addition, the data substitution unit 35 substitutes the load value which is determined to exceed the load-drop determination value in the load-drop determination unit 34 with an average value of the load values after the load value applied to the workpiece is determined to exceed the load-drop determination value. Therefore, even if the load-drop caused by the sliding occurs, the press-fitting process itself is not determined to abnormal. Thus, it is possible to improve the manufacturing yield while maintaining the quality of the press-fitting.

In the example of the present embodiment, the data substitution unit 35 substitutes the load value with the moving average value or substitute by forward substitution or backward substitution. However, it is also possible to substitute the load value with an average value between the load value which is determined to be normal before the exceeding load value and the load value which is determined to be normal after the exceeding load value or an ideal value at the position of the load value.

In addition, in the example of the present embodiment, whether or not the press-fitting process is normally performed on the workpiece is determined based on the load value data substituted by the data substitution unit 35. However, it is also possible to determine whether or not the press-fitting process is normally performed based on the eliminated data without substituting the load value when the sliding occurs.

Second Embodiment

Hereafter, the second embodiment of the present invention will be explained by using FIG. 12 to FIG. 15.
<Electrical Configuration of Press Device>

Figure 12:
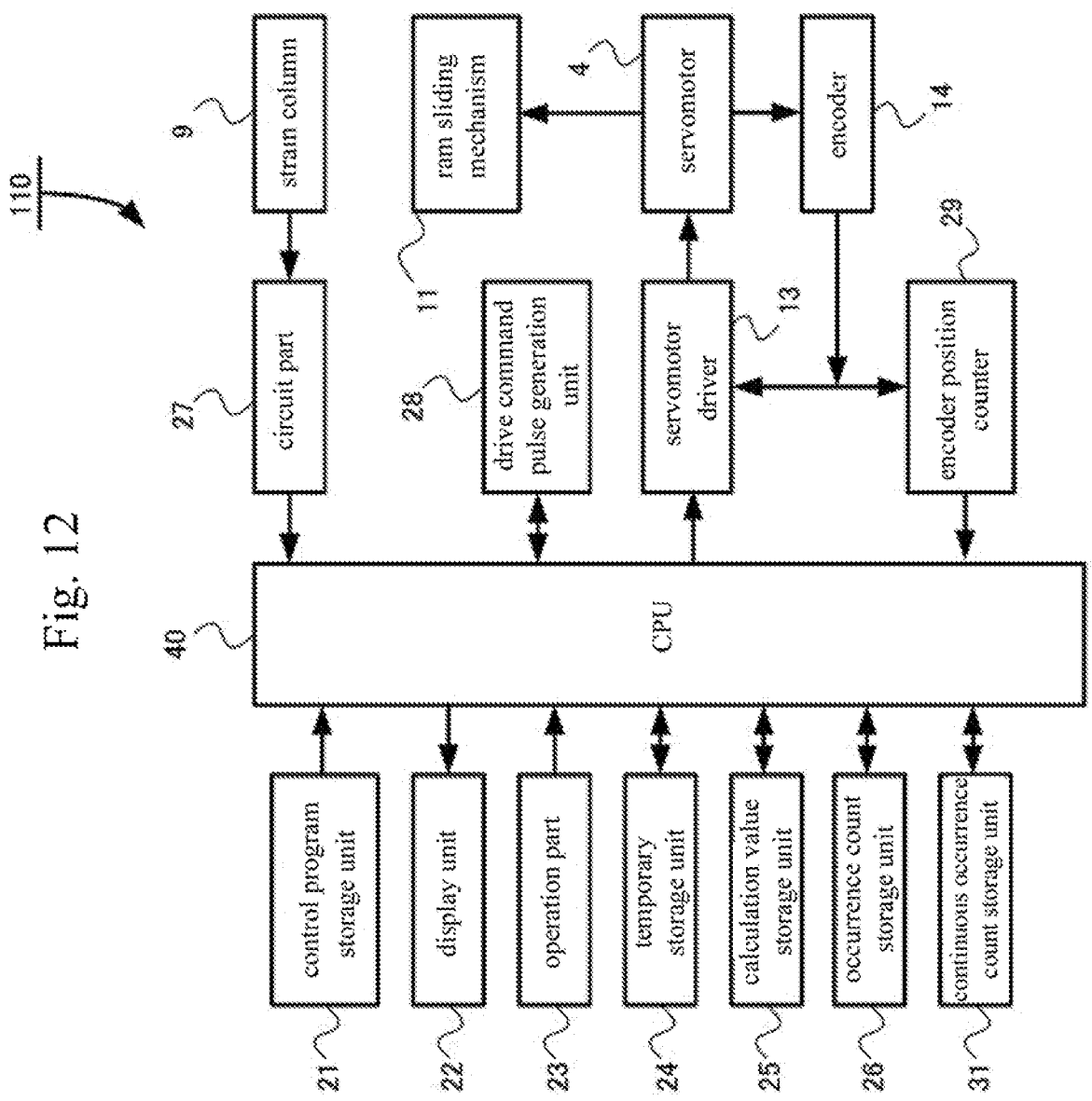
FIG. 12 is a drawing showing the electrical configuration of the press device concerning the second embodiment of the present invention.

As shown in FIG. 12, a press device 110 concerning the present embodiment is comprised of a servomotor driver 13, an encoder 14, a control program storage unit 21, a display unit 22, an operation part 23, a temporary storage unit 24, a calculation value storage unit 25, an occurrence count storage unit 26, a circuit part 27, a drive command pulse generation unit 28, an encoder position counter 29, a continuous occurrence count storage unit 31 and a CPU (central processing unit) 40. Note that the detailed explanation of the elements having the same reference numerals as the first embodiment will be omitted since they have same function.

The occurrence count storage unit 26 stores the number of occurrence counted by the counting unit 43 which counts the number of times where the load value obtained from the circuit part 27 stored in the temporary storage unit 24 is determined to exceed the load-drop determination value decided based on the moving average value calculated by the moving average calculation unit 32 and the dispersion average value calculated by the dispersion average value calculation unit 33 in the later described load-drop determination unit 34 in a series of the press-fitting process applied to the specific workpiece.

The continuous occurrence count storage unit 31 stores the continuously counted value in the counting of the counting unit 43 as a continuous occurrence count.
<Electrical Configuration of Central Processing Unit>

Figure 13:
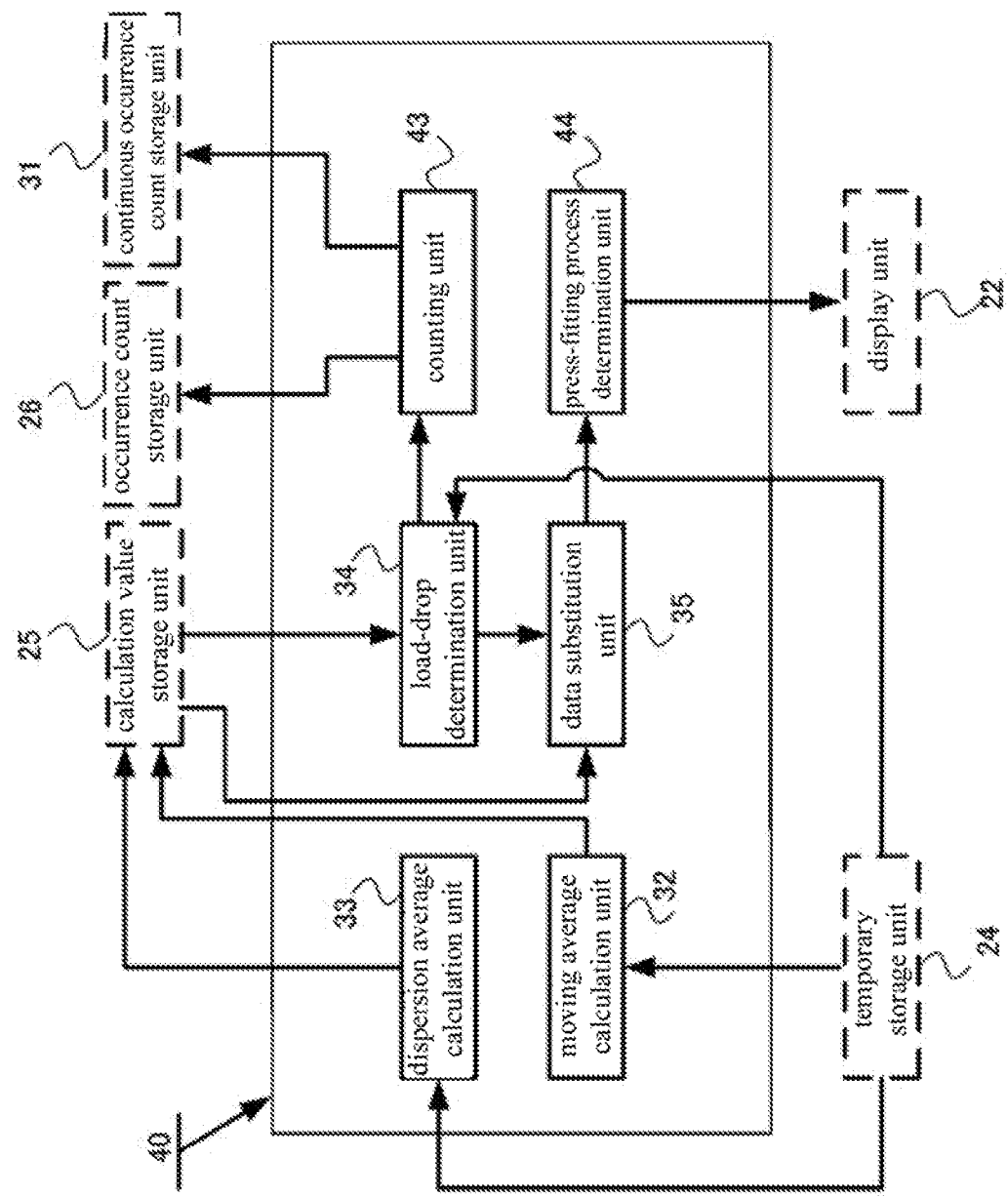
FIG. 13 is a drawing showing the electrical configuration of a central processing unit concerning the second embodiment of the present invention.

As shown in FIG. 13, the central processing unit 40 concerning the present embodiment is comprised of a moving average calculation unit 32, a dispersion average value calculation unit 33, a load-drop determination unit 34, a data substitution unit 35, a counting unit 43 and a press-fitting process determination unit 44. Note that the detailed explanation of the elements having the same reference numerals as the first embodiment will be omitted since they have same function.

The counting unit 43 is comprised of a counter to count the number of the load values which is determined to exceed the load-drop determination value data decided based on the moving average value calculated by the moving average calculation unit 32 and the dispersion average value calculated by the dispersion average value calculation unit 33 in the load values obtained from the circuit part 27 stored in the temporary storage unit 24 in the load-drop determination unit 34. The counted value is stored in the occurrence count storage unit 26 and the continuous occurrence count storage unit 31 via a not illustrated controller.

The press-fitting process determination unit 44 determines whether or not the press-fitting process is normally performed on the workpiece while including the load value data substituted by the data substitution unit 35 and considering the counted state (number of times) counted by the counting unit 43. Specifically, the press-fitting process determination unit 44 determines that the press-fitting process on the workpiece is abnormal when the number of counts counted by the counting unit 43 exceeds the preliminarily determined number of counts. In addition, the press-fitting process determination unit 44 determines that the press-fitting process on the workpiece is abnormal when the continuous occurrence count counted by the counting unit 43 exceeds the preliminarily determined number of continuous occurrence count. In addition, the press-fitting process determination unit 44 determines that the press-fitting process on the workpiece is abnormal when the continuous occurrence distance corresponding to the continuous occurrence count counted by the counting unit 43 exceeds the preliminarily determined continuous occurrence distance.

<Process of Press Device>

Hereafter, the processes of the press device 110 concerning the present embodiment will be explained by using FIG. 14 and FIG. 15.

First, the load-drop determination unit 34 obtains the current position and the current load value from the temporary storage unit 24 (Step S201), and reads the moving average value and the variance value from the calculation value storage unit 25 to calculate the lower limit threshold value (Step S202).

The load-drop determination unit 34 determines whether or not the obtained current load value is lower than the load-drop determination value (Step S203). In the above described step, when the load-drop determination unit 34 determines that the obtained current load value is not lower than the load-drop determination value ("No" in Step S203), a continuous occurrence counter is cleared (Step S204) and the process is shifted to Step S209.

On the other hand, when the load-drop determination unit 34 determines that the obtained current load value is lower than the load-drop determination value ("Yes" in Step S203), the obtained load value is substituted with the predetermined value (Step S205) and then determines whether or not the counter value of the continuous occurrence counter is "0" (Step S206). In the above described step, when it is determined that the counter value of the continuous occurrence counter is "0" ("Yes" in Step S206), the counter value of the occurrence counter is added by "1" (Step S207) and the counter value of the continuous occurrence counter is added by "1" (Step S208). When it is determined that the counter value of the continuous occurrence counter is not "0" ("No" in Step S206), the continuous occurrence counter value is added by "1" (Step S208) and the process is shifted to Step S209. When it is determined that the counter value of the continuous occurrence counter is not "0" ("No" in Step S206), it is considered that the sliding occurs continuously. Thus, the counter value of the occurrence counter is not added and the counter value of the continuous occurrence counter is added by "1" (Step S208) and the process is shifted to Step S209.

Then, the press-fitting process determination unit 44 determines whether or not the current load value is lower than the lower limit threshold value (Step S209). When the current load value is determined to be lower than the lower limit threshold value ("Yes" in Step S209), the process of error determination is performed (Step S210), all processes are finished and the error determination is output to the display unit 22.

On the other hand, when the press-fitting process determination unit 44 determines that the current load value is higher than the lower limit threshold value ("No" in Step S209), then determines whether or not the counter value of the occurrence counter is within the range of the predetermined count value (Step S211). In the above described step, when the press-fitting process determination unit 44 determines that the counter value of the occurrence counter exceeds the range of the predetermined count value ("No" in Step S211), the process of error determination is performed (Step S210), all processes are finished and the error determination is output to the display unit 22.

On the other hand, when the press-fitting process determination unit 44 determines that the counter value of the occurrence counter does not exceed the range of the predetermined count value ("Yes" in Step S211), then determines whether or not the counter value of the continuous occurrence counter is within the range of the predetermined count value (Step S212). In the above described step, when the press-fitting process determination unit 44 determines that the counter value of the continuous occurrence counter exceeds the range of the predetermined count value ("No" in Step S212), the process of error determination is performed (Step S210), all processes are finished and the error determination is output to the display unit 22.

On the other hand, when the press-fitting process determination unit 44 determines that the counter value of the continuous occurrence counter does not exceed the range of the predetermined count value ("Yes" in Step S212), the load average value (moving average value) is calculated again, the load average value (moving average value) is updated to a new value (Step S213), the standard deviation is calculated again, and the standard deviation is updated to a new value (Step S214).

Then, the CPU 40 determines whether or not the determination of Step S203 is finished for all load values (Step S215). When it is determined that the determination of Step S203 is finished for all load values ("Yes" in Step S215), all processes are finished and the success determination is output to the display unit 22. When it is determined that the determination of Step S203 is not finished for all load values ("No" in Step S215), the process is returned to Step S201.

As explained above, in the present embodiment, the load-drop determination unit 34 determines whether or not the detected load value exceeds the load-drop determination value decided based on the stored moving average value and the stored dispersion average value. The data substitution unit 35 substitute the detected value with the predetermined value when the detected value exceeds the load-drop determination value decided based on the stored moving average value and the stored dispersion average value in the load-drop determination unit 34. The counting unit 43 counts the number of times where the detected load value exceeds the load-drop determination value decided based on the stored moving average value and the stored dispersion average value in the load-drop determination unit 34. Then, the press-fitting process determination unit 44 determines whether or not the press-fitting process is normally performed on the workpiece in accordance with the load value data of a series of the press-fitting process including the load value data substituted by the data substitution unit 35 and the counted state of the counting unit 43. Namely, the press-fitting work is evaluated in a state that determination is performed for the data group where the load generated when the slipping occurs is substituted with an appropriate value and the determination is further performed according to the counted state of the counting unit 43. Accordingly, the load generated when the slipping occurs is appropriately determined and thus the press-fitting work can be more strictly evaluated. In addition, frequently occurred load-drop and continuously occurred load-drop are detected and error determination is performed by them. Thus, the failure can be properly found. Furthermore, when the state is checked at the position where the load-drop continuously occurs, the reason of the failure can be properly known.

In addition, the press-fitting process determination unit 44 determines whether or not the press-fitting process is normally performed on the workpiece in accordance with the load value data of a series of the press-fitting process including the load value data substituted by the data substitution unit 35 and the counted state of the counting unit 43. Thus, when the press-fitting process is not normally performed because of other reasons than the generation of sliding, the press-fitting process can be determined to be abnormal and the press-fitting work can be determined to be failure.

In addition, the press-fitting process determination unit 44 determines that the press-fitting process on the workpiece is abnormal when the number of counts counted by the counting unit 43 exceeds the preliminarily determined number of counts. Namely, even when the press-fitting process is originally determined to be normally performed, it is determined that a certain cause of failure may be included when the number of the count counted by the counting unit 43 exceeds the preliminarily determined number of counts. Thus, the press-fitting work is determined to abnormal. Accordingly, the press-fitting work can be more strictly evaluated since a certain cause of failure is predicted during the evaluation.

In addition, the press-fitting process determination unit 44 determines that the press-fitting process on the workpiece is abnormal when the continuous occurrence count counted by the counting unit 43 exceeds the preliminarily determined number of continuous occurrence count. Namely, even when the press-fitting process is originally determined to be normally performed, it is determined that a certain cause of failure may be included when the continuous occurrence count counted by the counting unit 43 exceeds the preliminarily determined number of counts. Thus, the press-fitting work is determined to abnormal. Accordingly, the press-fitting work can be more strictly evaluated since a certain cause of failure is predicted during the evaluation.

In addition, the press-fitting process determination unit 44 determines that the press-fitting process on the workpiece is abnormal when the continuous occurrence distance corresponding to the continuous occurrence count counted by the counting unit 43 exceeds the preliminarily determined continuous occurrence distance. Namely, even when the press-fitting process is originally determined to be normally performed, it is determined that a certain cause of failure may be included when the continuous occurrence distance corresponding to the continuous occurrence count counted by the counting unit 43 exceeds the preliminarily determined continuous occurrence distance. Thus, the press-fitting work is determined to abnormal. Accordingly, the press-fitting work can be more strictly evaluated since a certain cause of failure is predicted during the evaluation.

Figure 14:
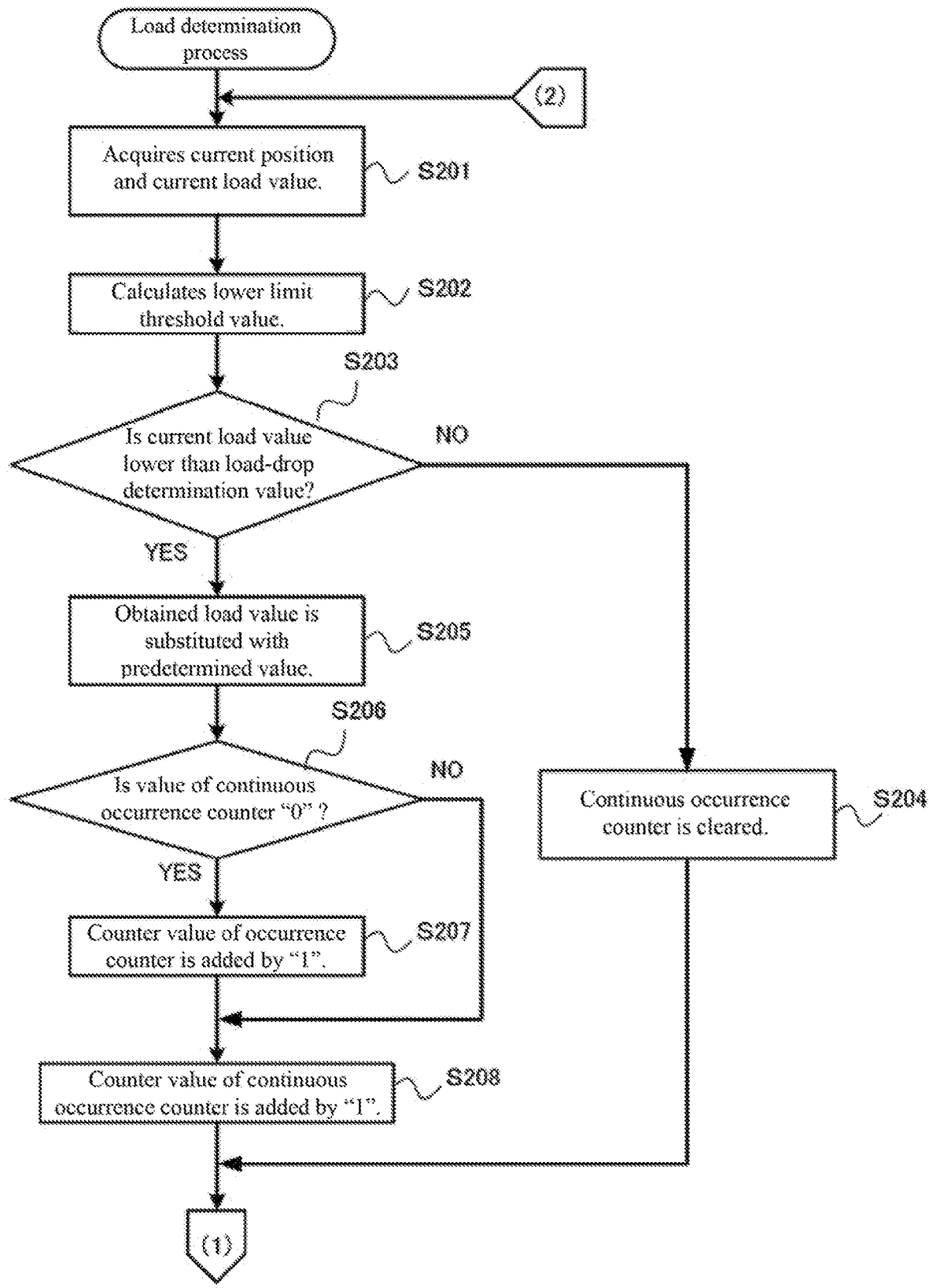
FIG. 14 is a drawing showing the processes of the press device concerning the second embodiment of the present invention.
Figure 15:
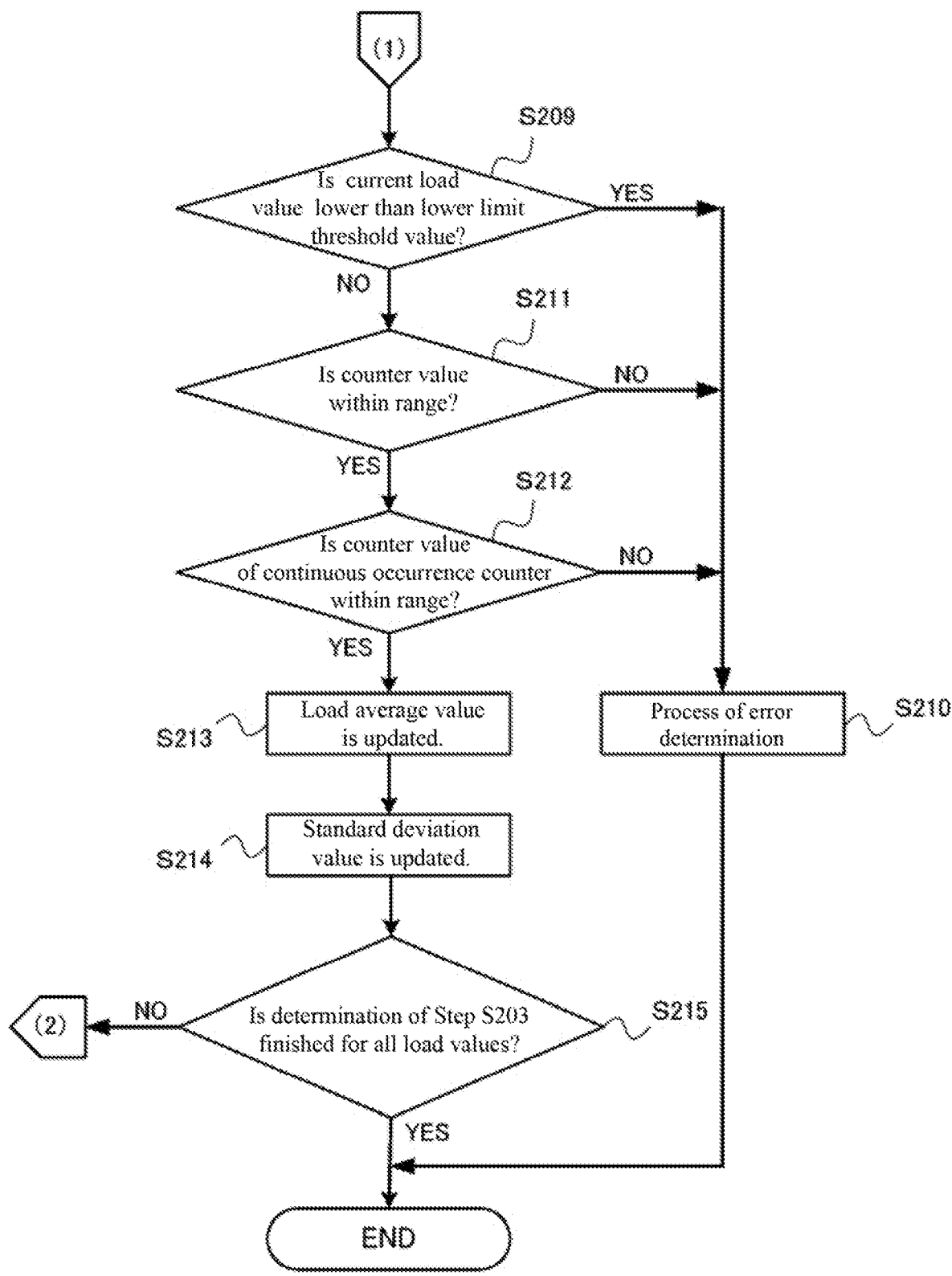
FIG. 15 is a drawing showing the processes of the press device concerning the second embodiment of the present invention.
Figure 16:
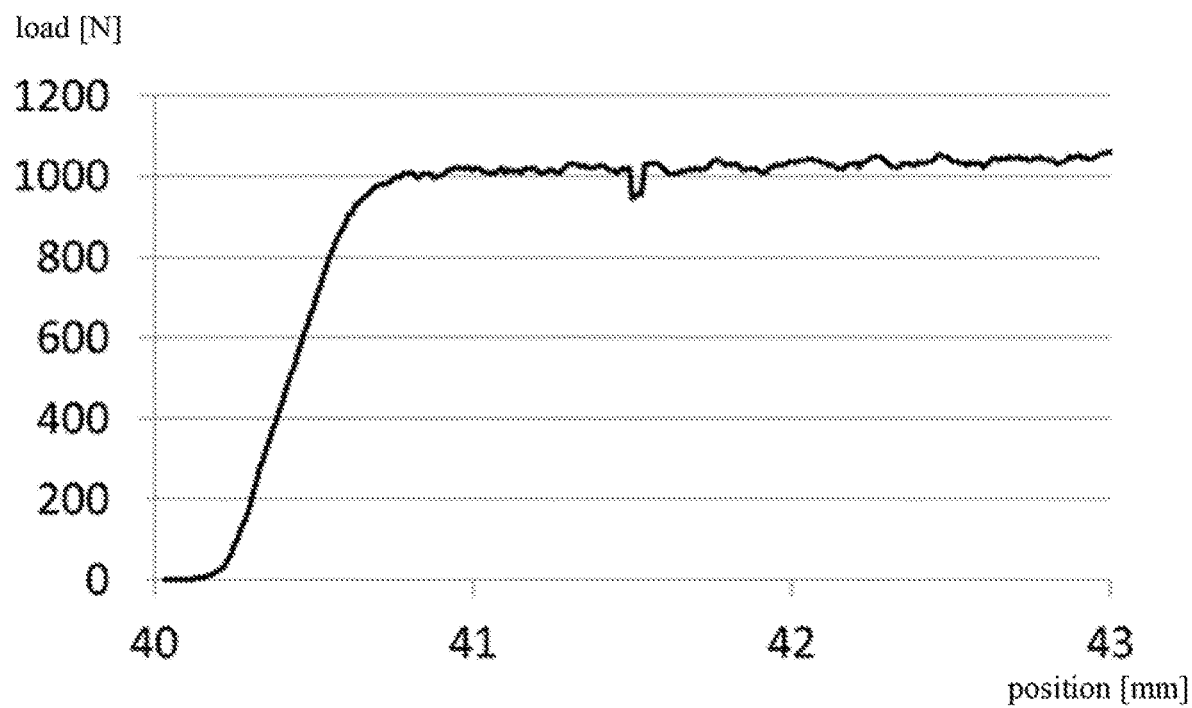
FIG. 16 is a drawing illustrating the position/load data in the press device concerning the first embodiment of the present invention where the data of the load slipping is substituted.
Figure 17:
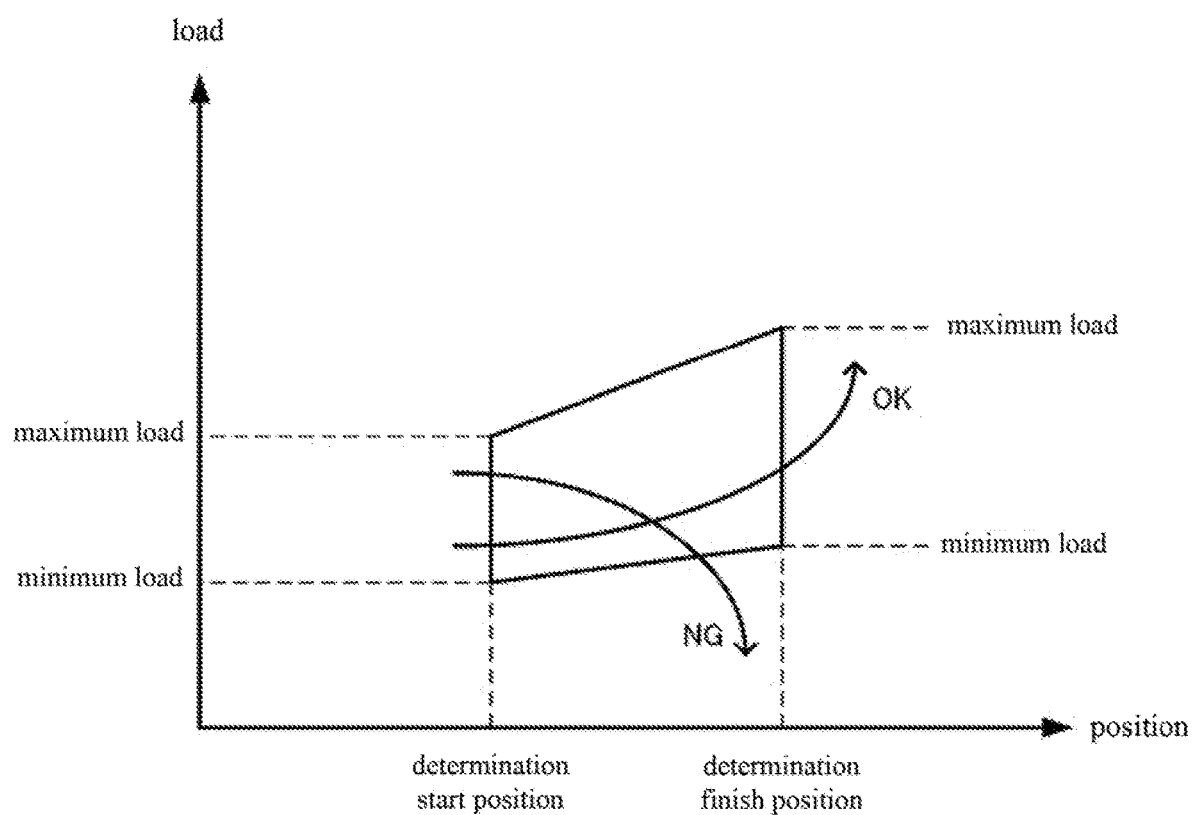
FIG. 17 is a drawing showing the conventional determination method.

Although the example shown in the above described FIG. 14 and FIG. 15 shows the method of counting the continuous occurrence, the determination can be also performed by the continuous occurrence distance. Namely, when the continuous occurrence counter is "0" in Step S206 of FIG. 14, this point can be regarded as the start point of the continuous occurrence. Instead of Step S207, the current position Pc is stored as the continuous occurrence start position Pcs and the continuous occurrence distance can be calculated by subtracting the continuous occurrence start position Pcs from the current position Pc at that time when the continuous occurrence counter is not "0" (i.e., state of continuous occurrence) in Step S206. In this case, in Step S211 of FIG. 15, the process of error determination can be performed by determining whether or not the continuous occurrence start position Pcs calculated above is within the range instead of comparing the value of the continuous occurrence counter.

Note that the press device of the present invention can be achieved by storing the processes of the press device in a recording medium readable by a computer system or computer and making the press device read the program stored in the recording medium to execute the program. The computer system or computer described above include hardware such as an OS (operating system) and peripheral devices.

In addition, "computer system or computer" includes a homepage providing environment (or display environment) when the WWW (World Wide Web) system is used.

Furthermore, the above described program can be transferred from the computer system or computer in which the program is stored in a recording device or the like to other computer systems or computers via a transmission medium or by transmission wave in the transmission medium. Here, "transmission medium" for transmitting the program means a medium having the function of transmitting the information. For example, a network (communication network) such as Internet and a communication line (communication wire) such as a telephone line can be used.

In addition, the above described program can be a program for achieving a part of the above described functions. Furthermore, the program can be a so-called differential file (differential program) which is combined with the programs which have already been stored in the computer system or computer to achieve the above described functions.

The embodiments of the present invention are explained in detail above. However, the specific configuration is not limited to the above described embodiments. The present invention includes design variation without departing from the scope of the invention. For example, although the determination function is included in a part of the function of the press device in the embodiments, the present invention is not limited to such a configuration. A determination device having the determination function can be provided independently with the press device. In addition, a server on a cloud can have the determination function.

DESCRIPTION OF THE REFERENCE NUMERALS

1; ram
1*a*; tubular body
2; ball screw
2*a*; screw shaft
2*b*; nut element
3; press body
4; electric motor
5; casing
6; tubular guide
9; strain column
13; servomotor driver
14; encoder
21; control program storage unit
22; display unit
23; operation part
24; temporary storage unit
25; calculation value storage unit
26; occurrence count storage unit
27; circuit part
28; drive command pulse generation unit
29; encoder position counter 30; CPU
31; continuous occurrence count storage unit
32; moving average calculation unit
33; dispersion average calculation unit
34; load-drop determination unit
35; data substitution unit
36; press-fitting process determination unit
40; CPU
43; counting unit
44; press-fitting process determination unit

The invention claimed is:

1. A press device, comprising:
a position detection unit that detects a position of a ram;
a load detecting unit that detects a load value applied to the ram;
a determination unit that determines whether or not a press-fitting process is normally preformed on a workpiece based on the position of the ram and the load value at the position;
a storage unit that stores a moving average value and a dispersion average value of the load value which are preliminarily calculated;
a load-drop determination unit that determines whether the load value detected by the load detecting unit exceeds a load-drop determination value which is decided based on the stored moving average value and the dispersion average value; and
a data substitution unit that substitutes the load value which is determined to exceed the load-drop determination value in the load-drop determination unit with a predetermined value.

2. The press device according to claim 1, wherein the data substitution unit substitutes the load value which is determined to exceed the load-drop determination value in the load-drop determination unit with an average value of the load value before the load value applied to the workpiece is determined to exceed the load-drop determination value.

3. The press device according to claim 1, wherein the data substitution unit substitutes the load value which is determined to exceed the load-drop determination value in the load-drop determination unit with a normal load value which is determined to be normal before the load value applied to the workpiece is determined to exceed the load-drop determination value.

4. The press device according to claim 1, wherein the data substitution unit substitutes the load value which is determined to exceed the load-drop determination value in the load-drop determination unit with a normal load value which is determined to be normal after the load value applied to the workpiece is determined to exceed the load-drop determination value.

5. The press device according to claim 1, further comprising:
a press-fitting process determination unit that determines whether or not the press-fitting process is normally preformed on the workpiece based on a load value data of a series of the press-fitting process including the load value data substituted by the data substitution unit.

6. The press device according to claim 5, further comprising:
a counting unit that counts the number of times where the load value is determined to exceed the load-drop determination value in the load-drop determination unit, wherein
the press-fitting process determination unit determines whether or not the press-fitting process is normally preformed on the workpiece considering the number counted by the counting unit.

7. A load correction method in a press device,
the press device comprising:
a position detection unit that detects a position of a ram;
a load detecting unit that detects a load value applied to the ram;
a determination unit that determines whether or not a press-fitting process is normally preformed on a workpiece based on the position of the ram and the load value at the position;
a storage unit that stores a moving average value and a dispersion average value of the load value which are preliminarily calculated;
a load-drop determination unit;
a data substitution unit; and
a press-fitting process determination unit,
the method comprising:
a first process of determining whether the load value detected by the load detecting unit exceeds a load-drop determination value which is decided based on the stored moving average value and the dispersion average value by the load-drop determination unit; and
a second process of substituting the load value which is determined to exceed the load-drop determination value in the load-drop determination unit with a predetermined value by the data substitution unit.

8. A non-transitory computer-readable recording medium in which a computer program for making a computer execute a load correction method in a press device is stored,
the press device comprising:
a position detection unit that detects a position of a ram;
a load detecting unit that detects a load value applied to the ram;
a determination unit that determines whether or not a press-fitting process is normally preformed on a workpiece based on the position of the ram and the load value at the position;
a storage unit that stores a moving average value and a dispersion average value of the load value which are preliminarily calculated;
a load-drop determination unit;
a data substitution unit; and
a press-fitting process determination unit,
the method comprising:
a first process of determining whether the load value detected by the load detecting unit exceeds a load-drop determination value which is decided based on the stored moving average value and the dispersion average value by the load-drop determination unit; and
a second process of substituting the load value which is determined to exceed the load-drop determination value in the load-drop determination unit with a predetermined value by the data substitution unit.

* * * * *